United States Patent
Lee et al.

(10) Patent No.: US 12,074,334 B2
(45) Date of Patent: Aug. 27, 2024

(54) BATTERY PACK AND METHOD OF ASSEMBLING THE SAME

(71) Applicant: SK On Co., Ltd., Seoul (KR)

(72) Inventors: Seung Hun Lee, Daejeon (KR); Seo Roh Rhee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/363,743

(22) Filed: Aug. 2, 2023

(65) Prior Publication Data

US 2024/0178497 A1 May 30, 2024

(30) Foreign Application Priority Data

Nov. 24, 2022 (KR) .......................... 10-2022-0159270

(51) Int. Cl.
| | |
|---|---|
| *H01M 50/209* | (2021.01) |
| *H01M 10/613* | (2014.01) |
| *H01M 10/647* | (2014.01) |
| *H01M 10/6554* | (2014.01) |
| *H01M 50/244* | (2021.01) |
| *H01M 50/264* | (2021.01) |
| *H01M 50/507* | (2021.01) |

(52) U.S. Cl.
CPC ....... *H01M 50/209* (2021.01); *H01M 10/613* (2015.04); *H01M 10/647* (2015.04); *H01M 10/6554* (2015.04); *H01M 50/244* (2021.01); *H01M 50/264* (2021.01); *H01M 50/507* (2021.01)

(58) Field of Classification Search
CPC ............. H01M 50/209; H01M 50/264; H01M 50/244; H01M 50/507; H01M 10/613; H01M 10/647; H01M 10/6554
See application file for complete search history.

(56) References Cited

U.S. PATENT DOCUMENTS

| | | | |
|---|---|---|---|
| 2013/0252058 A1 | 9/2013 | Kim | |
| 2015/0064541 A1* | 3/2015 | Noh | .................... H01M 50/209 |
| | | | 429/156 |
| 2017/0062789 A1* | 3/2017 | Sim | .................... H01M 50/505 |
| 2020/0212390 A1 | 7/2020 | Kume et al. | |
| 2020/0243928 A1 | 7/2020 | Schmidt | |

(Continued)

FOREIGN PATENT DOCUMENTS

| | | |
|---|---|---|
| CN | 111490195 B | 5/2022 |
| CN | 111033796 B | 11/2022 |

(Continued)

OTHER PUBLICATIONS

Extended European Search Report for the European Patent Application No. 23189370.2 issued by the European Patent Office on Feb. 27, 2024.

*Primary Examiner* — Karie O'Neill Apicella

(74) *Attorney, Agent, or Firm* — IP & T GROUP LLP

(57) ABSTRACT

A battery pack, may include: a plurality of cell stacks including a plurality of battery cells; a pack housing accommodating the plurality of cell stacks; a fixing bracket disposed between the plurality of cell stacks and the pack housing and between the plurality of cell stacks; and a fastening member fastening the fixing bracket to the pack housing, wherein the fixing bracket may be disposed to contact the plurality of battery cells on an upper side of the plurality of cell stacks.

12 Claims, 8 Drawing Sheets

(56) References Cited

U.S. PATENT DOCUMENTS

2020/0411817 A1   12/2020  You et al.
2022/0367952 A1   11/2022  Hwang et al.
2023/0022636 A1*  1/2023  Schmitt ............... H01M 10/653

FOREIGN PATENT DOCUMENTS

| CN | 115347298 A | 11/2022 |
|---|---|---|
| JP | 6680145 B2 | 4/2020 |
| JP | 2021007090 A | 1/2021 |
| KR | 10-2013-0107790 A | 10/2013 |
| KR | 10-2015-0024724 A | 3/2015 |
| KR | 10-2017-0025074 A | 3/2017 |

* cited by examiner

BATTERY PACK AND METHOD OF ASSEMBLING THE SAME

CROSS-REFERENCE TO RELATED APPLICATION (S)

This application claims benefit of priority to Korean Patent Application No. 10-2022-0159270 filed on Nov. 24, 2022 in the Korean Intellectual Property Office, the disclosure of which is incorporated herein by reference in its entirety.

BACKGROUND

1. Field

The present disclosure relates to a battery pack and a method of assembling the same.

2. Description of Related Art

A secondary battery refers to a battery capable of repeated charging and discharging because mutual conversion between chemical energy and electrical energy is reversible.

Such a secondary battery may be used as an energy source for electric vehicles, hybrid vehicles, energy storage systems (ESSs), and the like, which have recently attracted attention, including use in mobile devices.

The secondary battery may be used in a form in which one or more battery cells made of a flexible pouch-type battery cell or a prismatic or cylindrical can-type battery cell having rigidity are electrically connected, and in particular, in the case of an electric vehicle requiring high-output power characteristics, it may be used in a form of a battery module in which one or more cell stacks (in which a plurality of battery cells are stacked) are electrically connected or a battery pack in which one or more battery modules are electrically connected.

Meanwhile, in general, a battery pack includes a housing accommodating one or more battery modules, and the battery module includes a housing accommodating one or more battery cells, separately from the housing of the battery pack.

Accordingly, conventional battery packs have redundant components performing the same function, which is disadvantageous in terms of productivity and weight reduction of the battery pack.

SUMMARY

One aspect of the present disclosure is to provide a battery pack whose configuration is simplified as a whole by omitting redundant components even though the same function is performed, and a method of assembling the same.

According to one aspect of the present disclosure, a battery pack may include: a plurality of cell stacks including a plurality of battery cells; a pack housing accommodating the plurality of cell stacks; at least one fixing bracket disposed both between the plurality of cell stacks and the pack housing and between two adjacent cell stacks of the plurality of cell stacks; and a fastening member fastening the fixing bracket to the pack housing, wherein the at least one fixing bracket may be disposed to contact the plurality of battery cells on an upper side of the plurality of cell stacks.

According to one aspect of the present disclosure, the at least one fixing bracket may include: a first fixing bracket disposed to overlap one of the plurality of cell stacks; and a second fixing bracket disposed to overlap the two adjacent cell stacks.

According to one aspect of the present disclosure, the first fixing bracket and the second fixing bracket may have a length of the plurality of battery cells in a stacking direction, and each of the first fixing bracket and the second fixing bracket may include a fastening portion through which the fastening member passes and an extension portion extending from the fastening portion to cover the upper side of the plurality of battery cells.

According to one aspect of the present disclosure, the first fixing bracket may include only one extension portion, and the second fixing bracket may include two extension portions.

According to one aspect of the present disclosure, the battery pack may further include a support member disposed between the plurality of battery cells and the housing to cover both sides of the plurality of battery cells.

According to one aspect of the present disclosure, one surface of the support member facing the pack housing may include a plurality of protrusions and a plurality of insertion grooves, alternately formed, and the plurality of insertion grooves may be disposed between the plurality of protrusions.

According to one aspect of the present disclosure, one surface of the support member facing the pack housing may be disposed in an inclined shape so that a thickness decreases from an upper side to a lower side of the support member, and the pack housing may be formed in a shape corresponding thereto.

According to one aspect of the present disclosure, the battery pack may further include a compression member disposed between at least two of the plurality of battery cells.

According to one aspect of the present disclosure, the plurality of battery cells comprising the plurality of cell stacks may be prismatic battery cells including an electrode terminal on one side of the plurality of battery cells.

According to one aspect of the present disclosure, the battery pack may further include a bus bar a) a) disposed on a side of one surface of the plurality of battery cells provided with the electrode terminal and b) electrically connected to the electrode terminal; and a bus bar assembly including a bus bar frame on which the bus bar is disposed.

According to one aspect of the present disclosure, the battery pack may further include a cooling plate disposed to face the bus bar assembly and under the plurality of cell stacks.

According to one aspect of the present disclosure, the battery pack may further include a pack cover coupled to the pack housing and covering the plurality of cell stacks.

According to one aspect of the present disclosure, a method of assembling a battery pack may include: a first operation of transferring a plurality of cell stacks including a plurality of battery cells stacked in one direction and a support member disposed to cover the plurality of battery cells in a stacking direction of the plurality of battery cells to a pack housing; a second operation of disposing a fixing bracket between the plurality of cell stacks and the pack housing and between the plurality of cell stacks; and a third operation of fixing the plurality of cell stacks to the pack housing by fastening a fastening member to penetrate through the fixing bracket and the pack housing, wherein in the second operation, the fixing bracket may be disposed to contact the plurality of battery cells on an upper side of the plurality of cell stacks.

According to one aspect of the present disclosure, the plurality of cell stacks may be transferred to the pack housing by a lifting device, and the support member may include a plurality of insertion grooves into which legs of the lifting device are inserted.

According to one aspect of the present disclosure, a compression member may be disposed between at least the plurality of battery cells, to absorb pressure applied in a direction in which the plurality of battery cells are stacked when the plurality of cell stacks are transferred.

According to still another aspect of the present disclosure, a battery pack may include: a plurality of cell stacks including a plurality of battery cells; a pack housing for accommodating the plurality of cell stacks; at least one fixing bracket configured to fix the plurality of cell stacks to opposite sidewalls of the pack housing; a fastening member fastening the at least one fixing bracket to the housing; and a support member disposed on both sides in the arrangement direction of the plurality of battery cells, one surface of the support member may face the inner surface of the pack housing, and the surface of the support member and the pack housing facing each other may have an inclined shape.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
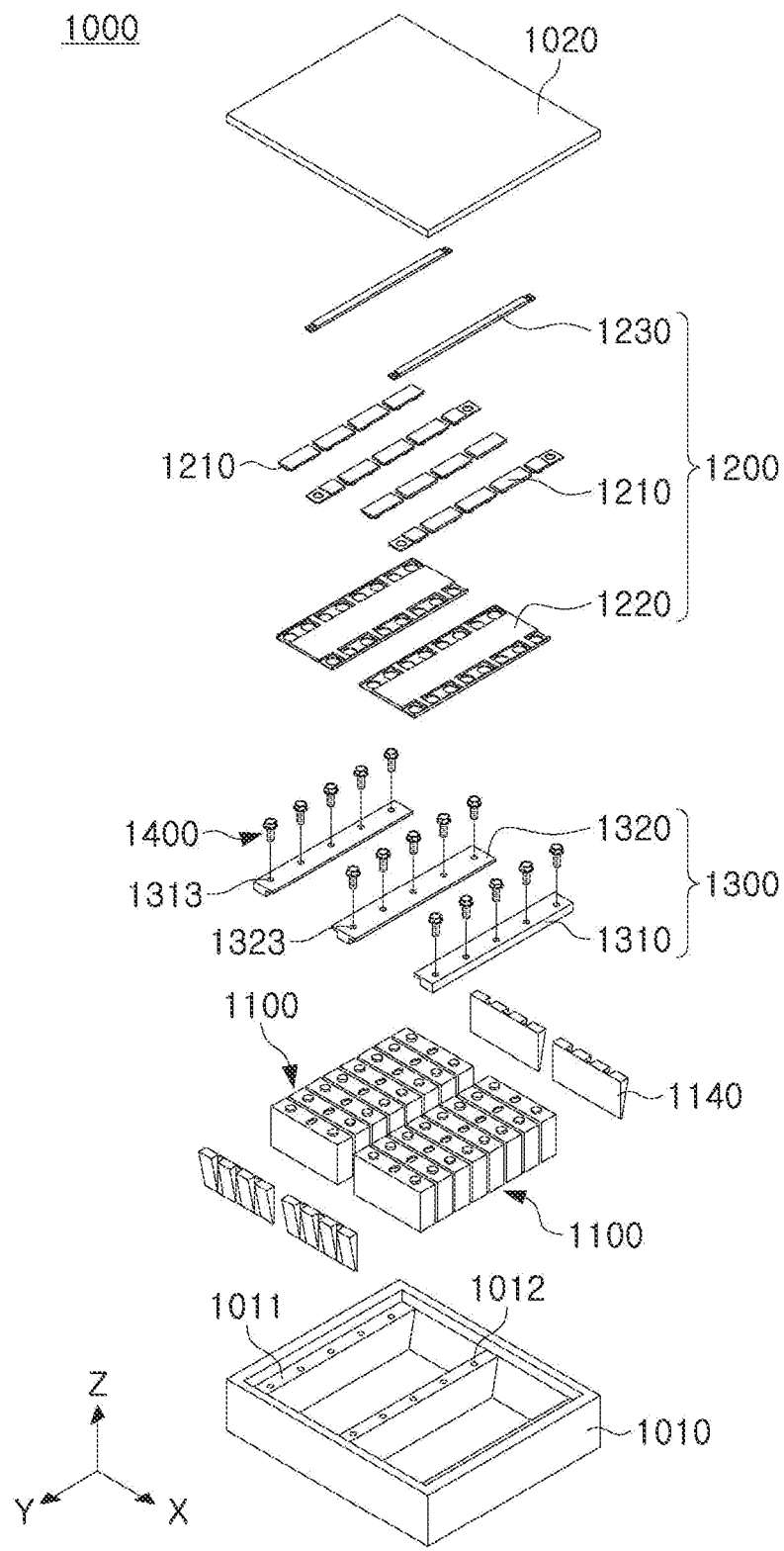
FIG. 1 is an exploded perspective view of a battery pack according to one embodiment of the present disclosure.

Prior to the detailed description of the present disclosure, the terms or words used in the present specification and claims described below should not be construed as being only understood from a common or dictionary meaning, as the inventor (s) may have described below in certain instances his/her invention using their own terminology. Additionally, the terms may be understood in view of the technical content of the present disclosure. Moreover, the embodiments described in this specification and the configurations shown in the drawings are illustrative embodiments of the present disclosure, and there may be various equivalents and modifications that can be substituted therefor.

Hereinafter, various embodiments of the present disclosure will be described in detail with reference to the accompanying drawings. At this time, it should be noted that the same components in the accompanying drawings are indicated by the same reference numerals as much as possible.

In addition, detailed descriptions of well-known functions and configurations will be omitted below, and for the same reason, some components in the accompanying drawings are exaggerated, omitted, or schematically illustrated, and the size of each component does not necessarily reflect the actual size thereof.

In the following description, singular expressions include plural expressions unless the context clearly dictates otherwise. The terms "include" or "comprise" are intended to indicate that there is a feature, number, step, operation, component, part, or combination thereof described in the specification, but it should be understood that the presence or addition of one or more other features or numbers, steps, operations, components, parts, or combinations thereof is not precluded.

In addition, in the following description, expressions such as "above," "upper," "below," "lower," "front," "rear," and the like, are expressed based on the directions illustrated in the drawings, and may be expressed differently if a direction of the object is changed.

In addition, terms including ordinal numbers such as "first" and "second" used herein may be used to describe various components, but the components are not limited by the terms, and the terms are used only for the purpose of distinguishing one component from another component. For example, without departing from the scope of the present invention, a first element may be termed a second element, and similarly, a second element may be termed a first element.

FIG. 1 is an exploded perspective view of a battery pack according to one embodiment of the present disclosure.

Referring to FIG. 1, a battery pack 1000 according to one embodiment of the present disclosure may include a pack housing 1010, a plurality of cell stacks (or battery module) 1100 accommodated in the pack housing 1010, and a pack cover 1020 coupled to the pack housing 1010 to cover the plurality of cell stacks 1100. For example, the pack housing 1010 and the pack cover 1020 forming an exterior of the battery pack 1000 may be formed of a material containing aluminum.

The pack housing 1010 may form an inner space in which a plurality of cell stacks 1100 are accommodated. The inner space of the pack housing 1010 may be partitioned into a plurality of spaces so that the plurality of cell stacks 1100 can be individually disposed.

A sidewall 1011 may be formed in the pack housing 1010 to penetrate through an inner space, and the inner space may be partitioned or divided into a plurality of spaces by the sidewall 1011. Each of the cell stacks 1100 may be individually disposed in one of the spaces, partitioned by the sidewall 1011.

In one embodiment, referring to the accompanying drawings, the sidewall 1011 may have a shape extending in a Y-direction, and as the sidewall 1011 is disposed, the inner space may be partitioned in an X-direction. The plurality of cell stacks 1100 may be disposed in respective spaces, partitioned in the X-direction.

A pack cover 1020 may be coupled to an upper portion of the pack housing 1010 in a state in which the plurality of cell stacks 1100 are disposed in the inner space. The pack cover 1020 may be coupled to the pack housing 1010 to completely cover the inner space. The plurality of cell stacks 1100 disposed in the inner space may be protected from external impacts by the pack cover 1020.

According to one embodiment of the present disclosure, the plurality of cell stacks 1100 may include a plurality of battery cells 1110 arranged in one direction. In one embodiment, referring to the drawings, the plurality of cell stacks 1100 may include a plurality of battery cells 1110 arranged in a Y-direction. A support member 1140 supporting the plurality of battery cells 1110 may be disposed outside the plurality of battery cells 1110. The support member 1140 may support the plurality of battery cells 1110 in the Y-direction in which the plurality of battery cells 1110 are arranged. A description related to the support member 1140 will be described later.

According to one embodiment of the present disclosure, the plurality of battery cells 1110 may be prismatic battery cells 1110. That is, the battery module 1100 may include a plurality of prismatic battery cells 1110 arranged in a Y-direction. The plurality of prismatic battery cells 1110 may be arranged in the Y-direction so that wide surfaces thereof face each other.

The prismatic battery cell may refer to a battery cell in which a case 1111 accommodating an electrode assembly and an electrolyte has a flat and angular shape, and the case 1111 may be made of aluminum.

According to one embodiment of the present disclosure, the plurality of prismatic battery cells 1110 may have positive and negative electrode terminals (or electrode terminals) protruding to one side thereof for example in a height direction (e.g., Z-direction). The positive electrode terminal 1112 and the negative electrode terminal 1113 may be provided to be spaced apart from each other in a length direction (e.g., X-direction) of the battery cell 1110. The plurality of battery cells 1110 may be electrically connected to neighboring battery cells 1110 through an electrode terminal.

In addition, referring to the drawings, a vent portion 1115 (shown in FIG. 2) may be provided in the case 1111 between the positive electrode terminal 1112 and the negative electrode terminal 1113. The vent portion 115 may be a passage through which gas generated inside the case 1111 is discharged.

According to one embodiment of the present disclosure, a bus bar assembly 1200 (as shown in FIG. 1) may be disposed on an upper side of the plurality of cell stacks 1100. The bus bar assembly 1200 may (as shown in FIG. 1) include a bus bar 1210 electrically connected to an electrode terminal and a bus bar frame 1220 on which the bus bar 1210 is disposed. In addition, the bus bar assembly 1200 may include a flexible printed circuit board (FPCB) 1230 (as shown in FIG. 1) electrically connected to the bus bar 1210 and receiving a voltage, temperature information, and the like, of the plurality of battery cells 1110.

According to one embodiment of the present disclosure, the bus bar frame 1220 may extend in a longitudinal direction (Y-direction based on the drawing) of the cell stack 1100, and may overlap the plurality of battery cells 1110 on an upper side of the battery module 1100.

Meanwhile, a portion of both sides of the plurality of battery cells 1110 in the longitudinal direction (X-direction based on the drawing) may not overlap the bus bar frame 1220 (in this case, the positive electrode terminal 1112 and the negative electrode terminal 1113 of at least the plurality of battery cells 1110 may overlap the bus bar frame 1220), and the corresponding portion may overlap a fixing bracket 1300 to be described later. That is, a bus bar assembly 1200 and a fixing bracket 1300 may be disposed on an upper side of the cell stack 1100 according to one embodiment of the present disclosure.

The bus bar frame 1220 may include a hole exposing electrode terminals 1112 and 1113 of the plurality of battery cells 1110 and vent portion 1115, and the bus bar 1210 may be electrically connected to the electrode terminals 1112 and 1113 exposed through the hole.

The bus bar 1210 may electrically connect electrode terminals 1112 and 1113 of neighboring battery cells 1110. In the accompanying drawings, a plurality of battery cells 1110 as illustrated are connected in series through the bus bar, but this embodiment thereof is not limited thereto, and various connection structures may be employed as needed.

According to one embodiment of the present disclosure, a fixing bracket 1300 may be disposed on an upper side of the plurality of cell stacks 1100. The fixing bracket 1300 may be a component fixing and coupling the cell stack 1100 to the battery pack 1000.

Figure 2:
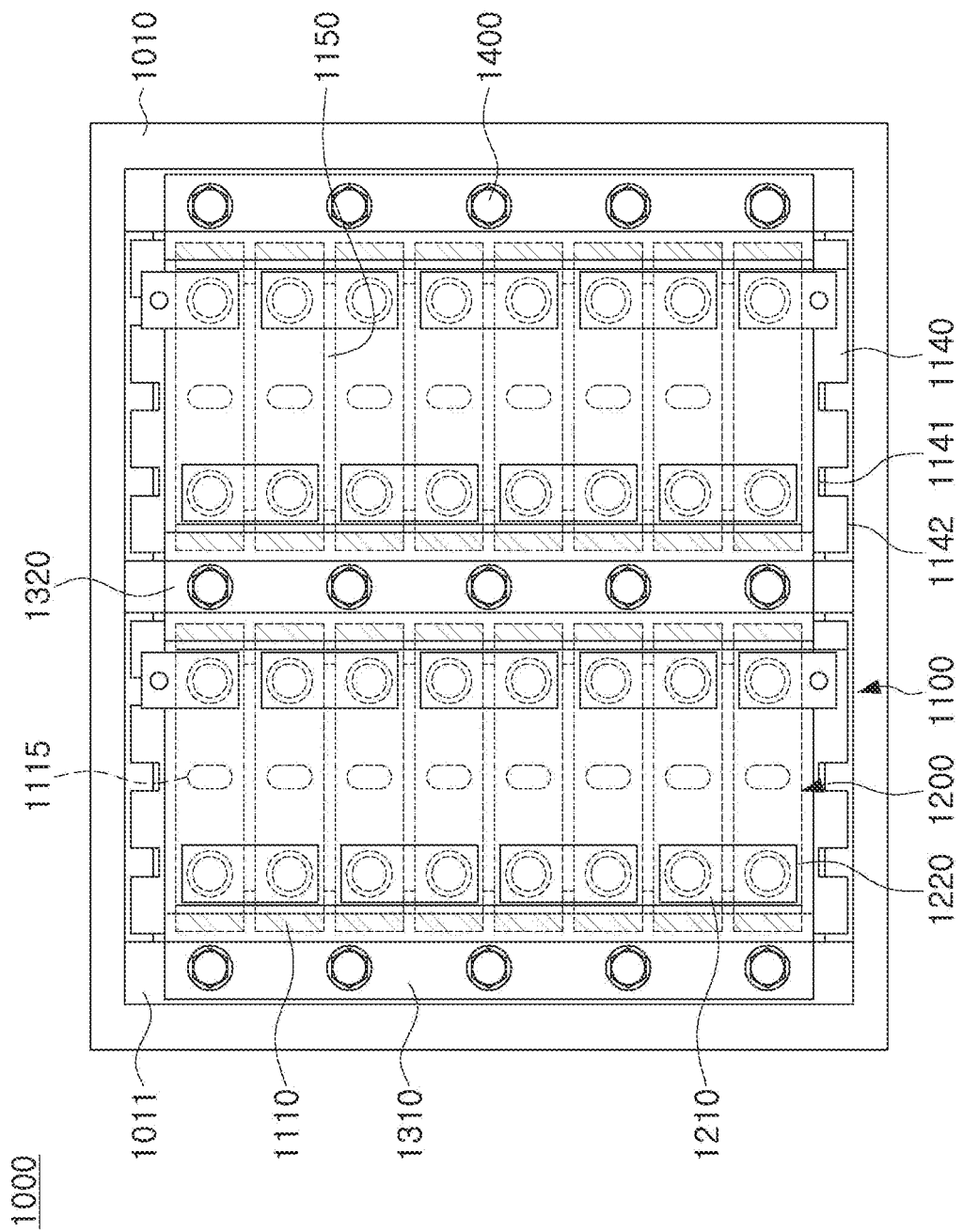
FIG. 2 is a plan view illustrating an assembled state of a battery pack according to one embodiment of the present disclosure.
Figure 3:
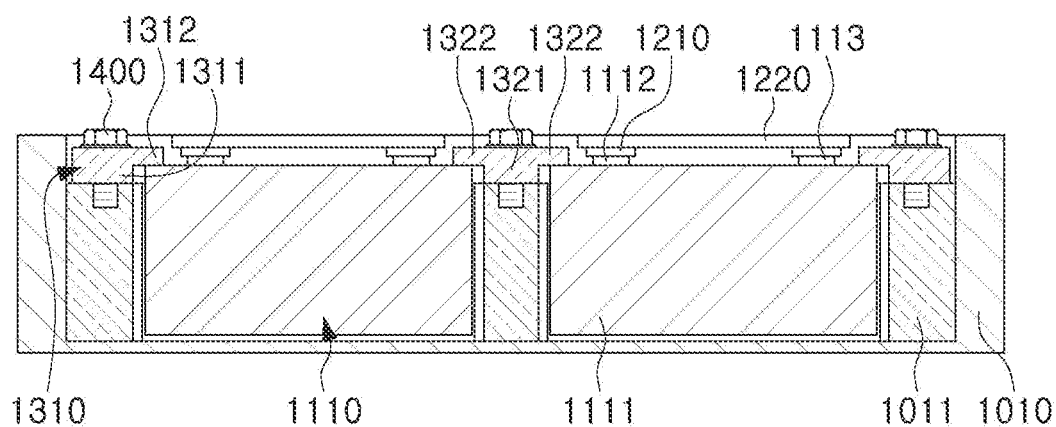
FIGS. 3 and 4 are side views illustrating an assembled state of a battery pack according to one embodiment of the present disclosure.
Figure 4:
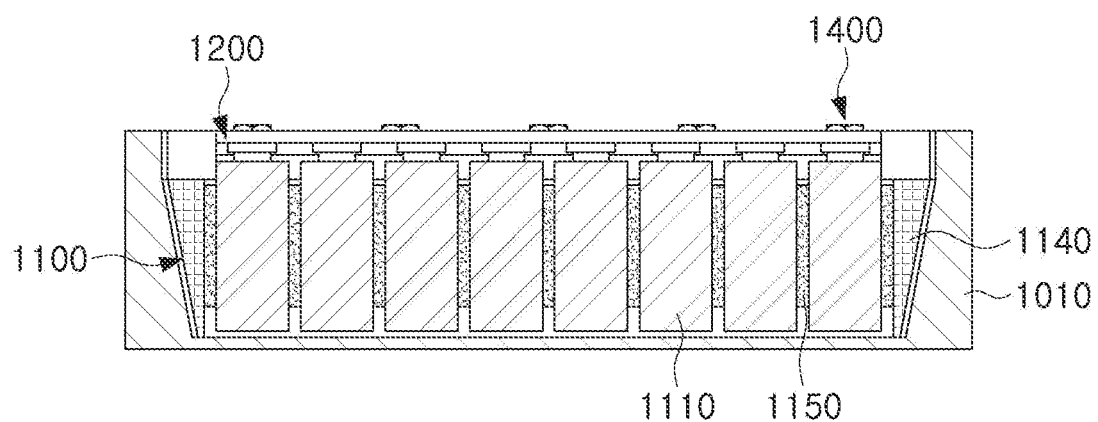

FIG. 2 is a plan view illustrating an assembled state of the battery pack according to one embodiment of the present disclosure, and FIGS. 3 and 4 are side views illustrating an assembled state of the battery pack according to one embodiment of the present disclosure.

The cell stack 1100 according to one embodiment of the present disclosure may not include a housing or top cover closing the plurality of battery cells 1110 except for the support member 1140. Accordingly, the plurality of battery cells 1110 may be directly fixed and coupled to the pack housing 1010.

The fixing bracket 1300 may be disposed to simultaneously overlap the plurality of cell stacks 1100 and the pack housing 1010 (including the side walls 1011). The fixing bracket 1300 may have a length in an X-direction so as to cover the cell stack 1100 and the pack housing 1010 at the same time, and may have a length in a Y-direction so as to overlap the plurality of battery cells 1110 included in the cell stack 1100 at the same time.

Both sides of the plurality of cell stacks 1100 may be supported by the fixing brackets 1300. Referring to FIGS. 2 and 3, the fixing bracket 1300 may be disposed between the cell stack 1100 and the pack housing 1010 and between the plurality of cell stacks 1100. While the fixing bracket 1300 illustrated in FIGS. 1 and 2 comprises separate elements 1310, 1320, these elements 1310 and 1320 may be connected together or otherwise comprise a unitary piece.

The fixing bracket 1300 may include a first fixing bracket 1310 and a second fixing bracket 1320. The first fixing bracket 1310 may be a fixing bracket disposed between the cell stack 1100 and the pack housing 1010, and the second fixing bracket 1320 may be a fixing bracket disposed between the plurality of cell stacks 1100.

The fixing bracket 1300 may include two first fixing brackets 1310 and one or more second fixing brackets 1320. Since the first fixing bracket 1310 is disposed between the cell stack 1100 and the pack housing 1010, the two first fixing brackets 1310 may be provided. Meanwhile, a different number of second fixing brackets 1320 disposed between the plurality of cell stacks 1100 may be provided according to the number of the plurality of cell stacks 1100. For example, when the battery pack 1000 includes n cell stacks 1100, n−1 second fixing brackets 1320 may be provided.

The first fixing bracket 1310 and the second fixing bracket 1320 may include extension portions 1312 and 1322 disposed on an upper side of the cell stack 1100.

In detail, the first fixing bracket 1310 and the second fixing bracket 1320 may include fastening portions 1311 and 1321 disposed on the upper side of the pack housing 1010 or the side wall 1011, and extension portions 1312 and 1322 disposed to overlap the upper side of the cell stack 1100.

The fastening portions 1311 and 1321 may have a thickness to compensate for a height difference between the pack housing 1010 or the side wall 1011 and the cell stack 1100.

In addition, the fastening portions 1311 and 1321 may be formed with a plurality of through-holes 1313 and 1323 into which a fastening member 1400 is inserted in a longitudinal direction.

As illustrated in FIG. 3, the fastening member 1400 may be fastened to the pack housing 1010 in the z direction. In this case, multiple fastening members 1400 are inserted into the through-holes 1313 and 1323 in fixing brackets 1310 and 1320.

The side wall 1011 of the pack housing 1010 may include a fastening hole 1012 (shown in FIG. 1) in which the fastening member 1400 is accommodated and fastened, and the fastening member 1400 may be fastened to the pack housing 1010 while being inserted into the fastening hole 1012.

The extension portions 1312 and 1322 may be portions extending from the fastening portions 1311 and 1321 in the X-direction. The first fixing bracket 1310 and the second fixing bracket 1320 may be disposed so that the extension portions 1312 and 1322 are placed toward the battery module 1100, and the extension portions 1312 and 1322 may be disposed to overlap a portion of the cell stacks 1100 on the upper side of the cell stack 1100. The plurality of cell stacks 1100 may be pressed and fixed in the z direction by the extension portions 1312 and 1322 in a state in which the fastening member 1400 is fastened to the fastening portions 1311 and 1321.

Since the first fixing bracket 1310 is disposed between the cell stack 1100 and the pack housing 1010, the first fixing bracket 1310 may include only one extension portion 1311. In addition, since the second fixing bracket 1320 is disposed between the plurality of cell stacks 1100, the second fixing bracket 1320 may include two extension portions 1321. For example, a cross-section of the first fixing bracket 1310 may be a ']' or '[' shape, and a cross-section of the second fixing bracket 1320 may be a 'T' shape.

Meanwhile, FIG. 4 is a view illustrating a state in which the cell stack 1100 is assembled to the pack housing 1010 when viewed from the X-direction. Prior to this description, the cell stack 1100 according to one embodiment of the present disclosure will be described with reference to FIGS. 5 to 7.

Figure 5:
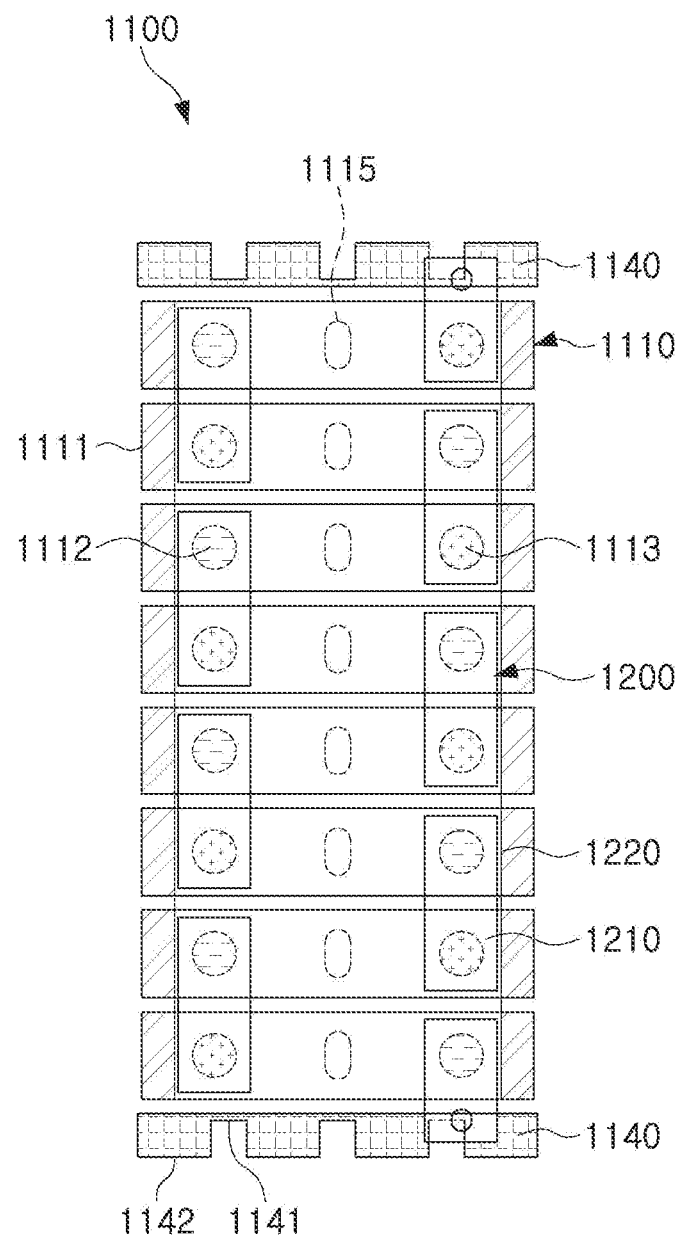
FIGS. 5 to 7 are views illustrating a cell stack assembled into a battery pack according to one embodiment of the present disclosure.
Figure 6:
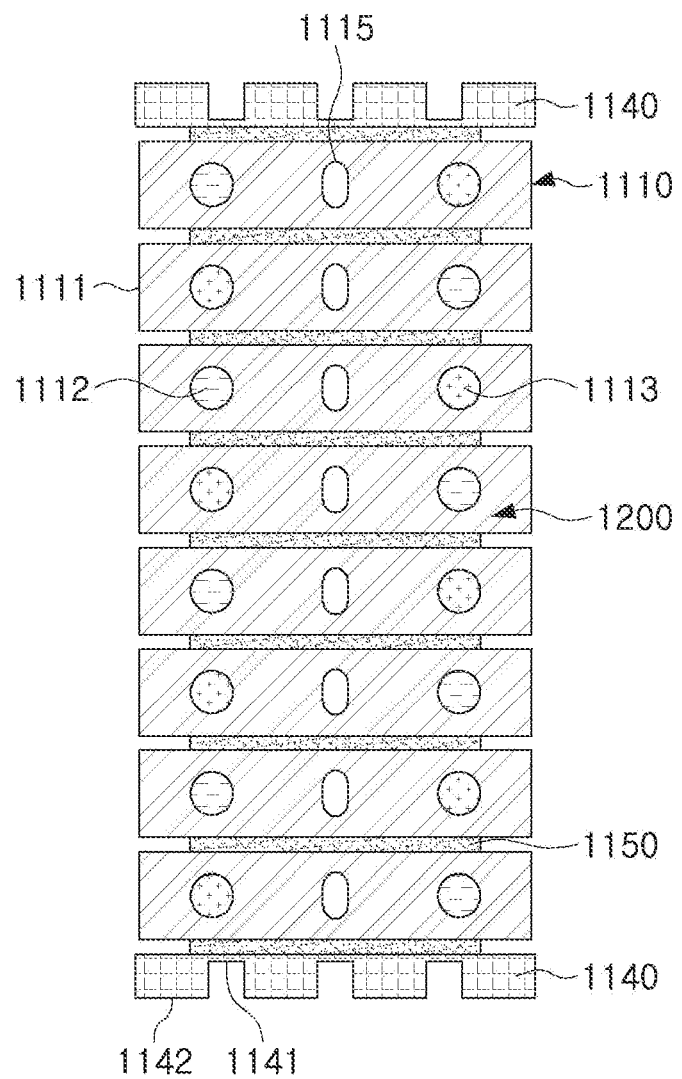
Figure 7:
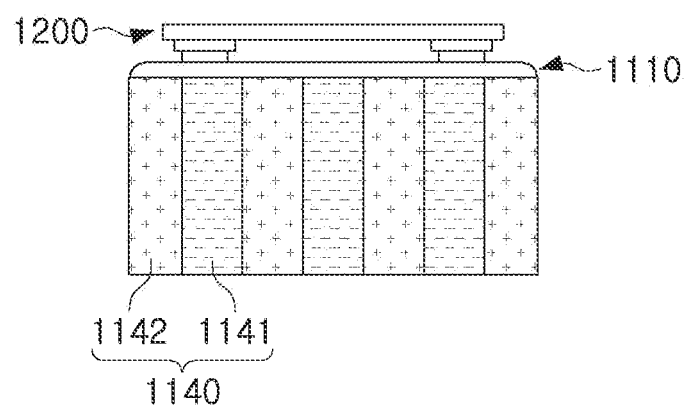

FIGS. 5 and 7 are views illustrating a cells stack assembled into a battery pack according to one embodiment of the present disclosure.

A cell stack 1100 according to this embodiment of the present disclosure may include a plurality of prismatic battery cells 1110 arranged in one direction. For example, the plurality of prismatic battery cells 1110 may be arranged in a Y-direction so that wide surfaces thereof face each other.

The plurality of battery cells 1110 may be arranged in the Y-direction at a predetermined interval, and a compression member 1150 may be disposed at intervals between each of the plurality of battery cells 1110. The compression member 1150 may be disposed between the plurality of battery cells 1110 to absorb swelling of the battery cells 1110 and maintain the interval between the plurality of battery cells 1110. For example, the compression member 1150 may be formed of a material such as polyurethane. In addition, as will be described later, the compression member 1150 may prevent the plurality of battery cells 1110 from sagging when the battery module 1100 is lifted.

The cell stack 1100 according to one embodiment of the present disclosure may include a support member 1140 on both sides of an arrangement direction of the plurality of battery cells 1110. The support member 1140 may be disposed outside the arrangement direction of the plurality of battery cells 1110 to support the plurality of battery cells 1110 in the y-direction. The support member 1140 may be fixed to a side surface of the battery cell 1110, disposed on an outermost side thereof or a compression member 1150, through an adhesive material. The support member 1140 may reduce a swelling phenomenon of the plurality of battery cells 1110 according to charging and discharging.

The support member 1140 may be formed of a plastic material, for example, a material such as polypropylene, and more specifically, may be provided in a form of a plastic injection molding into which die cast aluminum (Al) is inserted to reinforce rigidity. In addition, the support member 1140 may include a bus bar 1210, in detail, a part to which a HV terminal of the bus bar is connected.

Referring to FIG. 7, the support member 1140 may include an insertion groove 1141 on one surface facing the pack housing 1010. The insertion groove 1141 may be formed in a height direction (e.g., z direction based on the drawing), and may be provided in plurality in a width direction of the cell stack 1100. A protrusion 1142, protruding relatively more than an insertion groove 1141 may be alternately formed with an insertion groove 1141 on the one surface of the support member 1140, and the insertion groove 1141 may respectively be formed between the protrusions 1142. Legs 150 of a device (hereinafter, referred to as a lifting device) for transferring the cell stack 1100 to the pack housing 1010 may be inserted into the insertion groove 1141.

Figure 8:
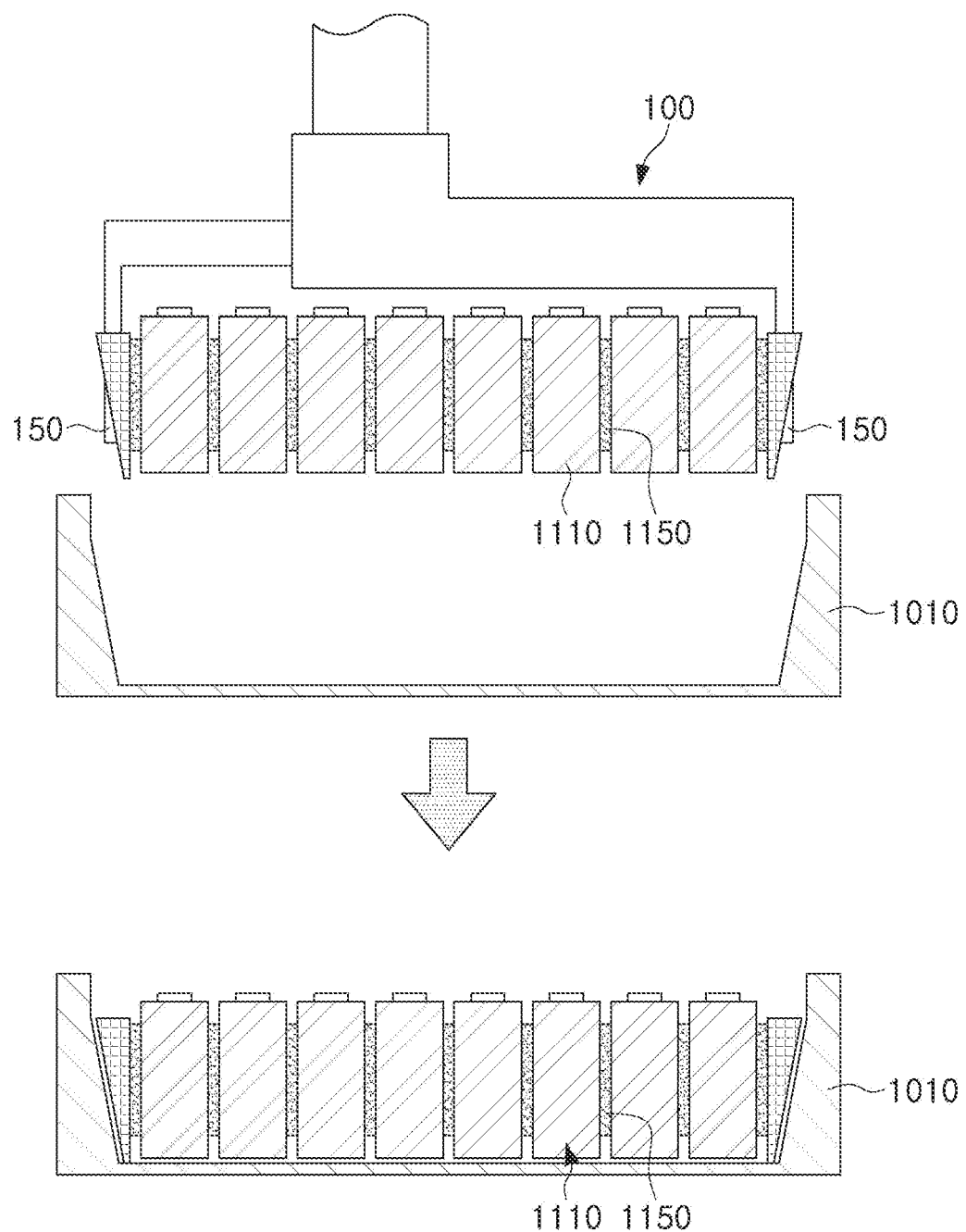
FIG. 8 is a view illustrating a process of assembling a cell stack according to one embodiment of the present disclosure into a battery pack.

FIG. 8 is a view illustrating a process of assembling a cell stack according to one embodiment of the present disclosure into a battery pack.

Referring to FIG. 8, a cell stack 1100 according to this embodiment of the present disclosure may be transported by a lifting device 100 and assembled to a pack housing 1010. Specifically, the lifting device 100 may lift the cell stack 1100 in a state in which the leg 150 of the lifting device 100 is inserted into an insertion groove 1141 of the support member 1140 and transfers the same into the pack housing 1010. When the cell stack 1100 is lifted in a state in which the leg 150 of the lifting device is inserted into the insertion groove 1141, since the battery module 1100 does not include a separate housing, a sagging phenomenon of the plurality of battery cells 1110 in a direction of gravity may occur. Accordingly, as described above, the battery module 1100 according to one embodiment of the present disclosure may prevent this by including the compression member 1150 between the plurality of battery cells 1110.

According to one embodiment of the present disclosure, as illustrated in FIG. 4, the support member 1140 may have a shape in which one surface thereof facing the pack housing 1010 is inclined. For example, the support member 1140 may have a shape in which the thickness decreases from an upper side to a lower side, and from the viewpoint of the cell stack 1100, may have a shape in which a length of the cell stack 1100 may be reduced. An inner side surface of the pack housing 1010 facing the one surface of the support member 1140 may have an inclined shape corresponding thereto. When the support member 1140 has such a shape, the cell stack 1100 may be more easily assembled to the pack housing 1010 along the inclined surface of the pack housing 1010. However, this is merely one embodiment of the present disclosure, and the support member 1140 may not have an inclined shape.

Meanwhile, according to another embodiment of the present disclosure, a gap filler (such as gap filler 1510 described below) may be disposed between the pack housing 1010 and the cell stack 1100. The gap filler has a relatively weak adhesive force, so that the cell stack 1100 may be attached or detached, and has an advantage in that the cell stack 1100 may be easily replaced.

Figure 9:
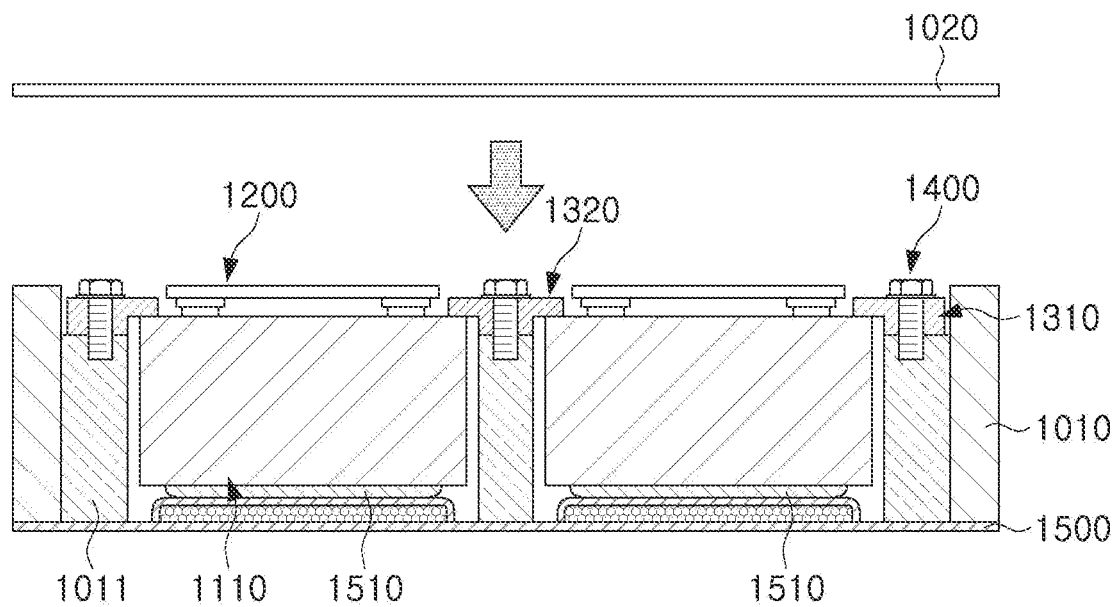
FIGS. 9 and 10 are diagrams illustrating a battery pack to which a cooling structure according to various embodiments of the present disclosure is applied.
Figure 10:
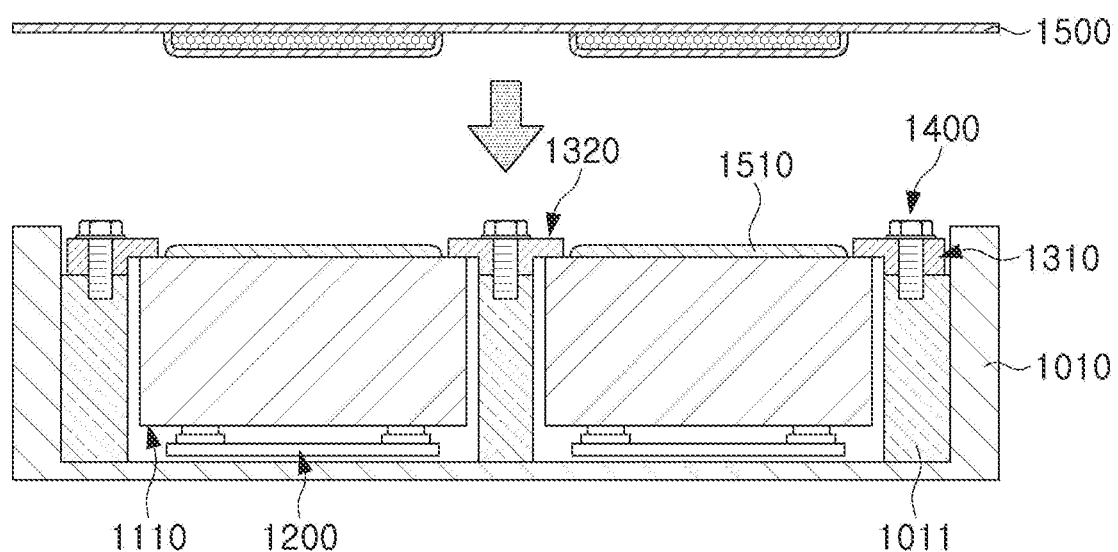

FIGS. 9 and 10 are diagrams illustrating a battery pack to which a cooling structure according to embodiments of the present disclosure is applied.

Referring to FIGS. 9 and 10, in a battery pack 1000 according to one embodiment of the present disclosure, a cooling structure (hereinafter referred to as a cooling plate) may be applied to an upper or a lower side of a pack housing 1010. In other words, in the battery pack 1000 according to this embodiment of the present disclosure, a cooling plate does not necessarily need to be disposed at a predetermined location, and may be selectively disposed on an upper side or a lower side of the pack housing 1010.

In one embodiment, the battery pack 1000 may include a cooling plate 1500 between a bottom surface of the pack housing 1010 and a cell stack 1100. In this case, the cell stack 1100 may be disposed so that an electrode terminal of the plurality of battery cells 1110 face an upper portion of the battery pack 1000, that is, a pack cover 1020. In another embodiment, the battery pack 1000 may include a cooling plate 1500 between the pack cover 1020 and the cell stack 1100. In this case, the cell stack 1100 may be disposed so that an electrode terminal of the plurality of battery cells 1110 face a lower portion of the battery pack 1000, that is, the bottom surface of the pack housing 1010.

Meanwhile, a gap filler 1510 may be further disposed between the cooling plate 1500 and the cell stack 1100. For example, the gap filler 1510 may be a thermal pad that facilitates thermal transfer. Accordingly, when the gap filler 1510 is provided such as a thermal pad, cooling efficiency may be increased. Alternately, a gap filler 1510 may be provided as a thermal interface material with non-adhesive for (TIM) recycling or reusing.

As described above, the battery pack 1000 according to one embodiment of the present disclosure may not include a separate cover covering a plurality of battery cells 1110, excluding a support member 1140 disposed in a stacking direction of the plurality of battery cells 1110 to transfer the cell stack 1100, and may replace a cover of the battery module 1100 in which the pack housing 1010 is omitted. Accordingly, economic feasibility of manufacturing the battery pack 1000 may be secured, and sufficient rigidity may be maintained through the thickness of the pack housing 1010, and the like.

As set forth above, according to one embodiment of the present disclosure, a battery pack has an advantage in that productivity is improved, and it is advantageous for reducing weight.

In addition, the battery pack according to one embodiment of the present disclosure may secure sufficient rigidity even though it has a simplified structure.

The present disclosure provides detail through specific examples given above. The examples given above are only examples to help the understanding of the present disclosure, and the scope of the present disclosure is not limited thereto.

While this disclosure includes specific examples, it will be apparent to one of ordinary skill in the art that various changes in form and details may be made in these examples without departing from the scope of the disclosure and any equivalents to the details provided. The examples described herein are to be considered in a descriptive sense only, and not for purposes of limitation of the claims. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not only by the detailed description but also by any equivalents.

What is claimed is:

1. A battery pack, comprising:
   a plurality of cell stacks including a plurality of battery cells;
   a pack housing accommodating the plurality of cell stacks;
   at least one fixing bracket disposed both between the plurality of cell stacks and the pack housing and between two adjacent cell stacks of the plurality of cell stacks;
   a fastening member fastening the fixing bracket to the pack housing; and
   a bus bar assembly including a bus bar disposed on a side of the plurality of battery cells and electrically connected to an electrode terminal of the plurality of battery cells, and a bus bar frame on which the bus bar is disposed,
   wherein the at least one fixing bracket is disposed to contact the plurality of battery cells on an upper side of the plurality of cell stacks,
   wherein the at least one fixing bracket comprises a fastening portion through which the fastening member passes and an extension portion extending from the fastening portion to cover the upper side of the plurality of battery cells,
   wherein the fastening portion is disposed on upper side of the pack housing and the at least one fixing bracket is spaced apart from the electrode terminal.

2. The battery pack of claim 1, wherein the at least one fixing bracket comprises
   a first fixing bracket disposed to overlap one of the plurality of cell stacks; and
   a second fixing bracket disposed to overlap the two adjacent cell stacks.

3. The battery pack of claim 2, wherein the first fixing bracket and the second fixing bracket have a length of the plurality of battery cells in a stacking direction.

4. The battery pack of claim 3, wherein the extension portion of the first fixing bracket comprises only one extension portion, and the extension portion of the second fixing bracket comprises two extension portions.

5. The battery pack of claim 1, wherein the cell stack further comprises a support member disposed between the plurality of battery cells and the housing to cover both sides of the plurality of battery cells.

6. The battery pack of claim 5, wherein one surface of the support member, facing the pack housing, comprises a plurality of protrusions and a plurality of insertion grooves, alternately formed, and the plurality of insertion grooves are disposed between the plurality of protrusions.

7. The battery pack of claim 5, wherein one surface of the support member, facing the pack housing, is disposed in an inclined shape so that a thickness decreases from an upper side to a lower side of the support member, and the pack housing is formed in a shape corresponding thereto.

8. The battery pack of claim 1, wherein the plurality of cell stacks further comprise a compression member disposed between at least two of the plurality of battery cells.

9. The battery pack of claim 1, wherein the plurality of battery cells comprising the plurality of cell stacks are prismatic battery cells including an the electrode terminal on one side of the plurality of battery cells.

10. The battery pack of claim 1, further comprising:
a cooling plate disposed opposite to the bus bar assembly and under the plurality of cell stacks.

11. The battery pack of claim 1, further comprising:
a pack cover coupled to the pack housing and covering the plurality of cell stacks.

12. A battery pack, comprising:
a plurality of cell stacks including a plurality of battery cells;
a pack housing for accommodating the plurality of cell stacks;
at least one fixing bracket configured to fix the plurality of cell stacks to opposite sidewalls of the pack housing;
a fastening member fastening the at least one fixing bracket to the housing;
a support member disposed on both sides in the arrangement direction of the plurality of battery cells; and
a bus bar assembly including a bus bar disposed on a side of the plurality of battery cells and electrically connected to an electrode terminal of the plurality of battery cells, and a bus bar frame on which the bus bar is disposed,
wherein one surface of the support member faces the inner surface of the pack housing, and
wherein the surface of the support member and the pack housing facing each other has an inclined shape,
wherein the at least one fixing bracket comprises a fastening portion through which the fastening member passes and an extension portion extending from the fastening portion to cover the upper side of the plurality of battery cells,
wherein the fastening portion is disposed on upper side of the pack housing and the at least one fixing bracket is spaced apart from the electrode terminal.

* * * * *